United States Patent [19]

Ogawa et al.

[11] Patent Number: 5,353,773
[45] Date of Patent: Oct. 11, 1994

[54] AIR-FUEL RATIO CONTROL SYSTEM FOR INTERNAL COMBUSTION ENGINES

[75] Inventors: Ken Ogawa; Yoshikazu Oshima; Kei Machida, all of Wako, Japan

[73] Assignee: Honda Giken Kogyo Kabushiki Kaisha, Tokyo, Japan

[21] Appl. No.: 51,877

[22] Filed: Apr. 26, 1993

[30] Foreign Application Priority Data

May 7, 1992 [JP] Japan .................. 4-142217

[51] Int. Cl.5 .............................. F02D 41/14
[52] U.S. Cl. ...................... 123/681; 123/694
[58] Field of Search ............ 123/675, 679, 681, 682, 123/694, 696

[56] References Cited

U.S. PATENT DOCUMENTS

| | | | |
|---|---|---|---|
| 4,825,837 | 5/1989 | Nakagawa | 123/681 |
| 4,939,658 | 7/1990 | Sekozawa et al. | 123/694 X |
| 5,115,782 | 5/1992 | Klinke et al. | 123/687 |
| 5,215,061 | 6/1993 | Ogawa et al. | 123/478 |
| 5,239,974 | 8/1993 | Ebinger et al. | 123/675 |

FOREIGN PATENT DOCUMENTS

| | | |
|---|---|---|
| 0295650 | 12/1988 | European Pat. Off. . |
| 0416511A1 | 3/1991 | European Pat. Off. . |
| 60-233333 | 11/1985 | Japan . |
| 61-126337 | 6/1986 | Japan . |
| 63-195349 | 8/1988 | Japan . |
| 2173926A | 10/1986 | United Kingdom . |

*Primary Examiner*—Tony M. Argenbright
*Attorney, Agent, or Firm*—Nikaido, Marmelstein, Murray & Oram

[57] ABSTRACT

An air-fuel ratio control system for an internal combustion engine calculates an amount of fuel to be supplied to the engine in response to the rotational speed of the engine and a parameter indicative of load on the engine, and an amount of fuel injected into an intake passage and adhering to the inner surface of the intake passage, based upon a direct supply ratio and a carry-off ratio. A feedback correction value is set to such a value that an air-fuel ratio in exhaust gases from the engine becomes equal to a desired value, and the amount of fuel calculated as above is corrected by the direct supply ratio, the carry-off ratio, and the feedback correction value set as above. A control speed at which the feedback correction value is corrected is set based upon at least one of the direct supply ratio and the carry-off ratio.

5 Claims, 13 Drawing Sheets

FIG.12

|  | Ae₀ | Ae₁ | Ae₂ | Ae₃ | Ae₄ |
|---|---|---|---|---|---|
| PBA₃ | | | | | |
| | NI₀,₂ (0,2) | (1,2) | (2,2) | (3,2) | |
| | KP₀,₂ | | | | |
| | KI₀,₂ | | | | |
| PBA₂ | KD₀,₂ | | | | |
| | NI (0,1) | (1,1) | (2,1) | (3,1) | |
| | KP | | | | |
| | KI | | | | |
| PBA₁ | KD | | | | |
| | (0,0) | (1,0) | (2,0) | (3,0) | |
| PBA₀ | | | | | |

FIG.13

|  | f(Ae₀,Be₀) | f(Ae₁,Be₁) | f(Ae₂,Be₂) | f(Ae₃,Be₃) | f(Ae₄,Be₄) |
|---|---|---|---|---|---|
| PBA₃ | | | | | |
| | NI₀,₂ (0,2) | (1,2) | (2,2) | (3,2) | |
| | KP₀,₂ | | | | |
| | KI₀,₂ | | | | |
| PBA₂ | KD₀,₂ | | | | |
| | NI (0,1) | (1,1) | (2,1) | (3,1) | |
| | KP | | | | |
| | KI | | | | |
| PBA₁ | KD | | | | |
| | (0,0) | (1,0) | (2,0) | (3,0) | |
| PBA₀ | | | | | |

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system which controls an amount of fuel supplied to an internal combustion engine, and more particularly to an air-fuel ratio control system which controls the supply of fuel injected into an intake pipe of the engine in a manner compensating for a fuel amount adhering to the inner surface of the intake pipe.

2. Prior Art

Conventionally, air-fuel ratio control systems for internal combustion engines are well known, which control operation of fuel injection valves arranged in an intake system of the engine in a feedback manner responsive to an output from an oxygen concentration sensor (air-fuel ratio sensor) arranged in an exhaust system of the engine such that the air-fuel ratio of a mixture supplied to the engine becomes equal to a desired value.

In air-fuel ratio control systems of this kind, a feedback gain which determines the control speed at which the air-fuel ratio is varied during the feedback control is determined by setting a frequency at which a correction value for correcting the air-fuel ratio is increased and decreased, in response to the rotational speed of the engine or by reducing the above control speed when the engine is in a decelerating condition, as proposed e.g. by Japanese Provisional Patent Publication (Kokai) No. 60-233333, or by varying the above control speed in response to the temperature of engine coolant, as proposed e.g. by Japanese Provisional Patent Publication (Kokai) No. 63-195349. Further, it has been proposed to determine the feedback gain in response to absolute pressure within the intake pipe.

As stated above, conventionally, the feedback gain is determined in response to engine operating parameters such as the engine rotational speed, the engine coolant temperature and the intake pipe absolute pressure.

On the other hand, in conventional internal combustion engines of the type that fuel is injected into an intake pipe, there is a problem that some of injected fuel adheres to the inner surface of the intake pipe, so that a required amount of fuel cannot be drawn into the combustion chamber, resulting in a difficulty of accurately controlling the air-fuel ratio of a mixture supplied to the engine. To solve this problem, there has been proposed a fuel supply control method which estimates a fuel amount which is to adhere to the inner surface of the intake pipe and one which is to be drawn into the combustion chamber by evaporation from the fuel adhering to the intake pipe, and determines a fuel injection amount based upon the estimated fuel amounts (Japanese Provisional Patent Publication (Kokai) No. 61-126337).

To improve this fuel supply control method, a supply fuel amount correction method has been proposed by the assignee of the present application, which calculates a fuel amount adhering to the inner surface of the intake pipe by the use of coefficients Ae and Be which are obtained by correcting a direct supply ratio (the ratio of a fuel amount drawn into the combustion chamber to the whole amount of fuel injected into the intake pipe) and a carry-off ratio (the ratio of a fuel amount carried off the inner surface of the intake pipe to the amount of fuel adhering to the inner surface), the two ratios being determined based upon the temperature of engine coolant and the intake pipe absolute pressure, and corrects the fuel amount to be supplied to the combustion chamber by the use of the amount of fuel adhering to the inner surface of the intake pipe and the coefficients Ae, Be U.S. Pat. No. 5,215,061.

However, according to 60-233333 in which the feedback gain is determined in response to engine operating parameters such as the engine rotational speed and intake air pressure, these engine operating parameters do not directly represent the amount of fuel actually drawn into the cylinders of the engine. As a result, the determined value of the feedback gain cannot always be optimal to operating conditions of the engine. There is the same disadvantage with 63-195349 using the engine coolant temperature for determining the feedback gain and the above-mentioned proposed method of using the intake pipe absolute pressure for determining the feedback gain.

Further, according to U.S. Pat. No. 5,215,061, an output from the oxygen concentration sensor is used to correct the fuel supply amount by the use of an amount of fuel adhering to the intake pipe inner surface in such a manner that a feedback correction coefficient KO2 is calculated in response to the output from the oxygen concentration sensor and a required fuel amount (required fuel injection amount) Tout is corrected by the calculated correction coefficient. As a result, the amount of correction of the Tout value can be excessive, resulting in degraded exhaust emission characteristics.

SUMMARY OF THE INVENTION

It is the object of the invention to provide an air-fuel ratio control system for an internal combustion engine, which is capable of setting the feedback gain or control speed at which the air-fuel ratio of a mixture supplied to the engine is feedback-controlled, to optimal values to operating conditions of the engine, thereby improving exhaust emission characteristics of the engine.

To attain the above object, the present invention provides an air-fuel ratio control system for an internal combustion engine having at least one combustion chamber, an intake passage having an inner surface, fuel injection means arranged in the intake passage, and an exhaust passage, the air-fuel ratio control system including fuel supply amount-calculating means for calculating an amount of fuel to be supplied to the engine in response to the rotational speed of the engine and a parameter indicative of load on the engine, direct supply ratio-calculating means for calculating a direct supply ratio defined as a ratio of a fuel amount directly drawn into the combustion chamber during intake stroke in a present cycle of the engine to the whole fuel amount injected in the same cycle, carry-off ratio-calculating means for calculating a carry-off ratio defined as a ratio of a fuel amount carried off the inner surface of the intake passage and drawn into the combustion chamber during intake stroke in the present cycle to the whole fuel amount which adhered to the inner surface of the intake passage in an immediately preceding cycle, air-fuel ratio-detecting means arranged in the exhaust passage for detecting an air-fuel ratio in exhaust gases from the engine, feedback correction value-setting means for setting a feedback correction value to a value such that the air-fuel ratio detected by the air-fuel ratio-detecting means becomes equal to a desired value, and fuel supply amount-correcting means for correcting the amount of fuel calculated by the fuel supply amount-calculating means by the direct supply ratio, the carry-off ratio, and the feedback correction value, wherein an amount of fuel corrected by the fuel supply amount-correcting means is injected by the fuel injection means into the intake passage.

The air-fuel ratio control system according to the invention is characterized in that the feedback correction value-setting means includes control speed-setting means for setting a control speed at which the feedback correction value is corrected, based upon at least one of the direct supply ratio and the carry-off ratio.

Preferably, the feedback correction value is a feedback correction coefficient which is determined in response to the air-fuel ratio detected by the air-fuel ratio-detecting means and by which the amount of fuel calculated by the fuel supply amount-calculating means is multiplied.

In a preferred embodiment of the invention, the control speed-setting means sets the control speed based upon the direct supply ratio and pressure within the intake passage, when the following equation is satisfied:

$$Ae/(1-Ae) \geq Be$$

where Ae represents the direct supply ratio, and Be the carry-off ratio.

Preferably, the control speed-setting means sets the control speed based upon the direct supply ratio, the carry-off ratio, and the pressure within the intake passage, when the equation is not satisfied.

In a preferred embodiment of the invention, the control speed is a feedback gain which is determined by at least one of a proportional term, an integral term, a differential term, the proportion term, the integral term, the differential term determining the feedback correction value, and frequency at which the feedback correction value is updated.

The above and other objects, features, and advantages of the invention will be more apparent from the following detailed description taken in conjunction with the accompanying drawings.

BRIEF DESCRIPTION OF THE DRAWINGS

FIG. 12 shows maps for determining the coefficients KP, KI, KD, and the "thinning-out" number NI;

FIG. 13 shows other maps for determining the values of KP, KI, KD, and NI;

DETAILED DESCRIPTION

The invention will now be described in detail with reference to the drawings showing an embodiment thereof.

Figure 1:
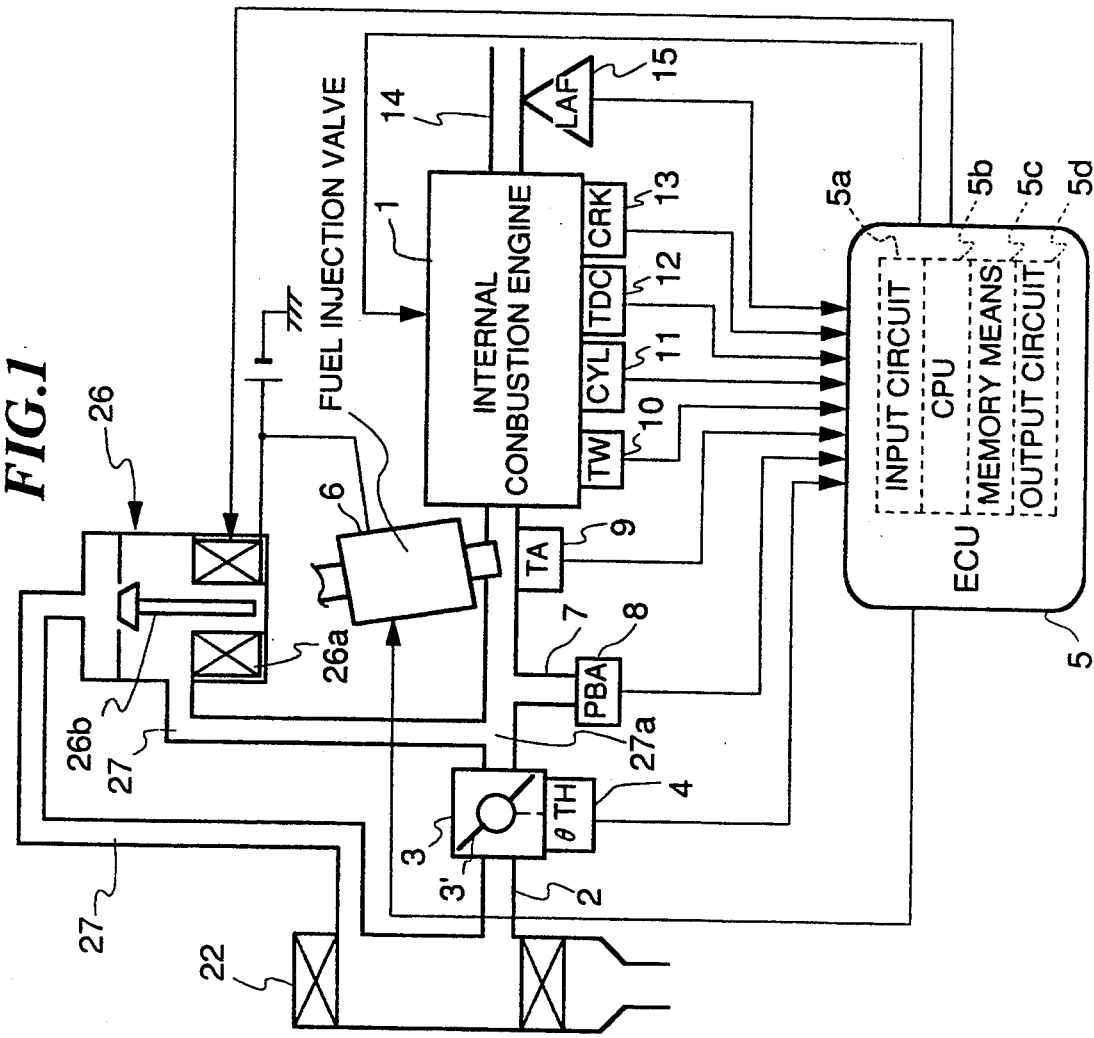
FIG. 1 is a block diagram showing the whole arrangement of an internal combustion engine and an air-fuel ratio control system therefor, according to an embodiment of the invention.

Referring first to FIG. 1, there is illustrated the whole arrangement of an internal combustion engine, and an air-fuel ratio control system therefor, according to an embodiment of the invention. In the figure, reference numeral 1 designates an internal combustion engine for automotive vehicles. The engine is a four-cylinder type, for instance. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

An auxiliary air passage 27 opens at one end thereof into the intake pipe 2 at a location downstream of the throttle valve 3' and communicates with the atmosphere at the other end thereof through an air cleaner 22. Arranged across the auxiliary air passage 27 is an auxiliary air amount control valve (hereinafter merely referred to as "the AIC control valve") 26, which controls the idling rotational speed of the engine 1 in response to a control signal from the ECU 5 and has its valve opening (the opening area of the passage 27) controlled by the above control signal. In the illustrated embodiment, the AIC control valve 26 is formed by a linear output-type solenoid valve which is comprised of a solenoid 26a connected to the ECU 5, and a valve element 26b displaceable in response to energization of the solenoid 26a to vary the opening area of the auxiliary air passage 27 by an amount proportional to an amount of current applied to the solenoid 26a.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure within the intake pipe 2 to the ECU 5.

An intake air temperature (TA) sensor 9 is inserted into a wall portion of the intake pipe 2 downstream of the conduit 7, for supplying an electric signal indicative of the sensed intake air temperature TA to the ECU 5.

An engine coolant temperature (TW) sensor 10, which is formed of a thermistor or the like, is mounted in the cylinder block of the engine 1, for supplying an electric signal indicative of the sensed engine coolant temperature TW to the ECU 5. A cylinder-discriminating (CYL) sensor 11, a TDC sensor 12, and a crank angle (CRK) sensor 13 are arranged in facing relation to a camshaft or a crankshaft of the engine 1, not shown. The CYL sensor 11 generates a pulse at a predetermined crank angle of a particular cylinder of the engine, and the TDC sensor 12 generates a pulse as a TDC signal pulse at each of predetermined crank angles whenever the crankshaft rotates through 180 degrees, both the pulses being supplies to the ECU 5. The CRK sensor 13 generates a pulse as a CRK signal pulse at each of predetermined crank angles whenever the crankshaft rotates through a predetermined angle m (e.g. 45 degrees) much smaller than 180 degrees, and supplies the CRK signal pulse to the ECU 5.

Output signal pulses from the CYL sensor 11, the TDC sensor 12, and the CRK sensor 13 are used for controlling the timing of execution of fuel injection timing, ignition timing, etc. and for detecting the engine rotational speed NE.

An air-fuel ratio sensor (hereinafter referred to as "the LAF sensor") 15 is arranged in an exhaust pipe 14 of the engine 1, for sensing an air-fuel ratio in exhaust gases from the engine 1 and for supplying an electric signal indicative of the sensed air-fuel ratio to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c having a ROM storing various operational programs which are executed in the CPU 5b, various maps and tables, etc., and a RAM for storing results of calculations therefrom, etc., and an output circuit 5d which outputs driving signals to the fuel injection valves 6, the AIC control valve 26, etc.

Figure 2:
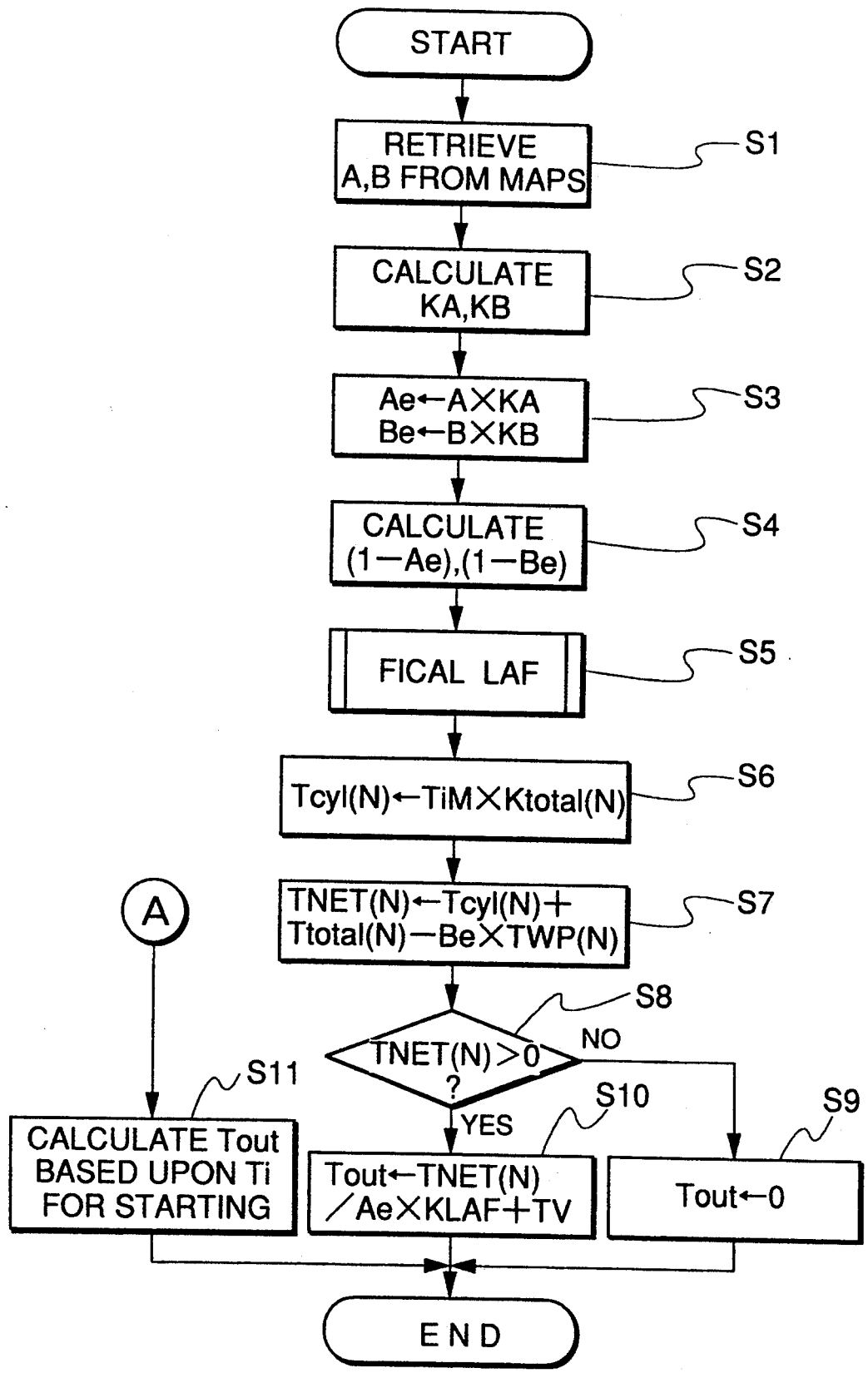
FIG. 2 is a flowchart of a program for calculating a fuel injection amount (Tout)

FIG. 2 shows a program for calculating the valve opening period of the fuel injection valves 6, i.e., a fuel injection amount Tout. This program is executed upon generation of each TDC signal pulse and in synchronism therewith.

At a step S1, a basic direct supply ratio A and a basic carry-off ratio B are calculated. The basic direct supply ratio A is defined as a ratio of a fuel amount directly or immediately drawn into a combustion chamber during intake stroke in the present cycle to the whole fuel amount injected in the same cycle, the basic direct supply ratio including a fuel amount carried off the inner surface of the intake pipe 2 by evaporation etc. in the same cycle. The basic carry-off ratio B is defined as a ratio of a fuel amount carried off the inner surface of the intake pipe and drawn into the combustion chamber during intake stroke in the present cycle to the whole fuel amount which adhered to the inner surface of the intake pipe 2 in the last or immediately preceding cycle. The basic direct supply ratio A and the basic carry-off ratio B are read, respectively, from an A map and a B map set in accordance with coolant temperature TW and intake pipe absolute pressure PBA, in response to the detected TW and PBA values. The basic direct supply ratio A and the basic carry-off ratio B may be calculated by interpolation, if required.

Figure 3:
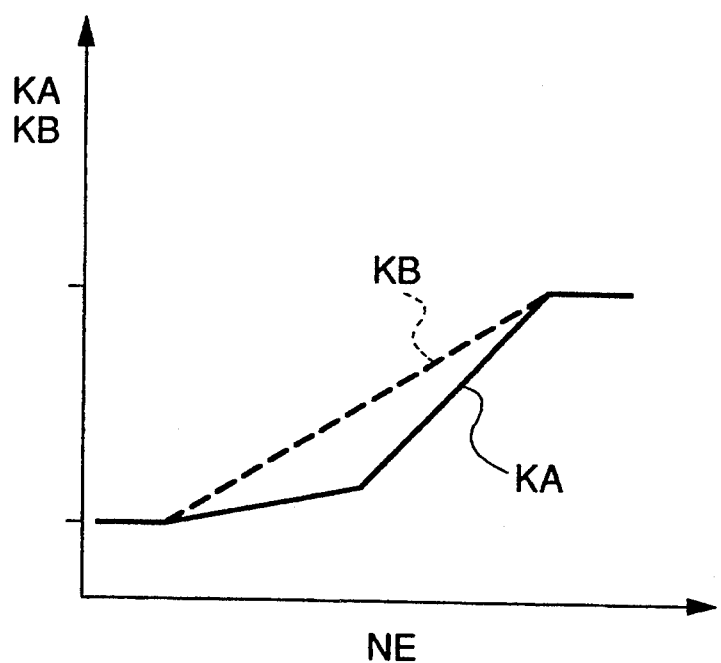
FIG. 3 shows tables for determining correction coefficients KA, KB for correcting a basic direct supply ratio A and a basic carry-off ratio B.

At the next step S2, correction coefficients KA and KB, which correct the basic direct supply ratio A and the basic carry-off ratio B, are calculated. The correction coefficients KA and KB are determined in response to the engine rotational speed NE, by tables shown in FIG. 3. In the tables, the correction coefficients KA, KB are set such that they increase as the engine rotational speed NE increases.

The reason why the correction coefficients KA and KB are thus increased as the engine rotational speed NE increases is that the basic direct supply ratio A and the basic carry-off ratio B apparently increase as the intake air flow speed in the intake pipe increases with an increase in the engine rotational speed NE.

Next, at a step S3, corrected values Ae and Be of the basic direct supply ratio A and the basic carry-off ratio B are calculated by the use of the following equations (1) and (2). Further, values (1−Ae) and (1−B) are calculated at a step S4, followed by the program proceeding to a step S5:

$$Ae = A \times KA \qquad (1)$$

$$Be = B \times KB \qquad (2)$$

At a step S5, an air-fuel ratio control mode-determining subroutine (FICAL LAF), hereinafter described, is executed. Then, at a step S6, a required fuel amount TCYL(N) for each cylinder, which does not include an additive correction term Ttotal, referred to hereinafter, is calculated by the use of the following equation (3):

$$Tcyl(N) = TiM \times Ktotal(N) \qquad (3)$$

where (N) represents a number allotted to the cylinder for which the required fuel amount Tcyl is calculated. TiM represents a basic fuel amount to be applied when the engine is under normal operating conditions (i.e., operating conditions other than the starting condition) and is calculated in response to the rotational speed NE and the intake pipe absolute pressure PBA. Ktotal(N) represents the product of all correction coefficients (e.g. a coolant temperature-dependent correction coefficient KTW and a leaning correction coefficient KLS) which are calculated based upon engine operating parameter signals from various sensors, including a desired air-fuel ratio coefficient KCMD which is calculated by the subroutine FICAL LAF at the step S5. Ktotal(N) does not include an air-fuel ratio correction coefficient KLAF which is calculated in response to an output from the LAF sensor 15.

Figure 4:
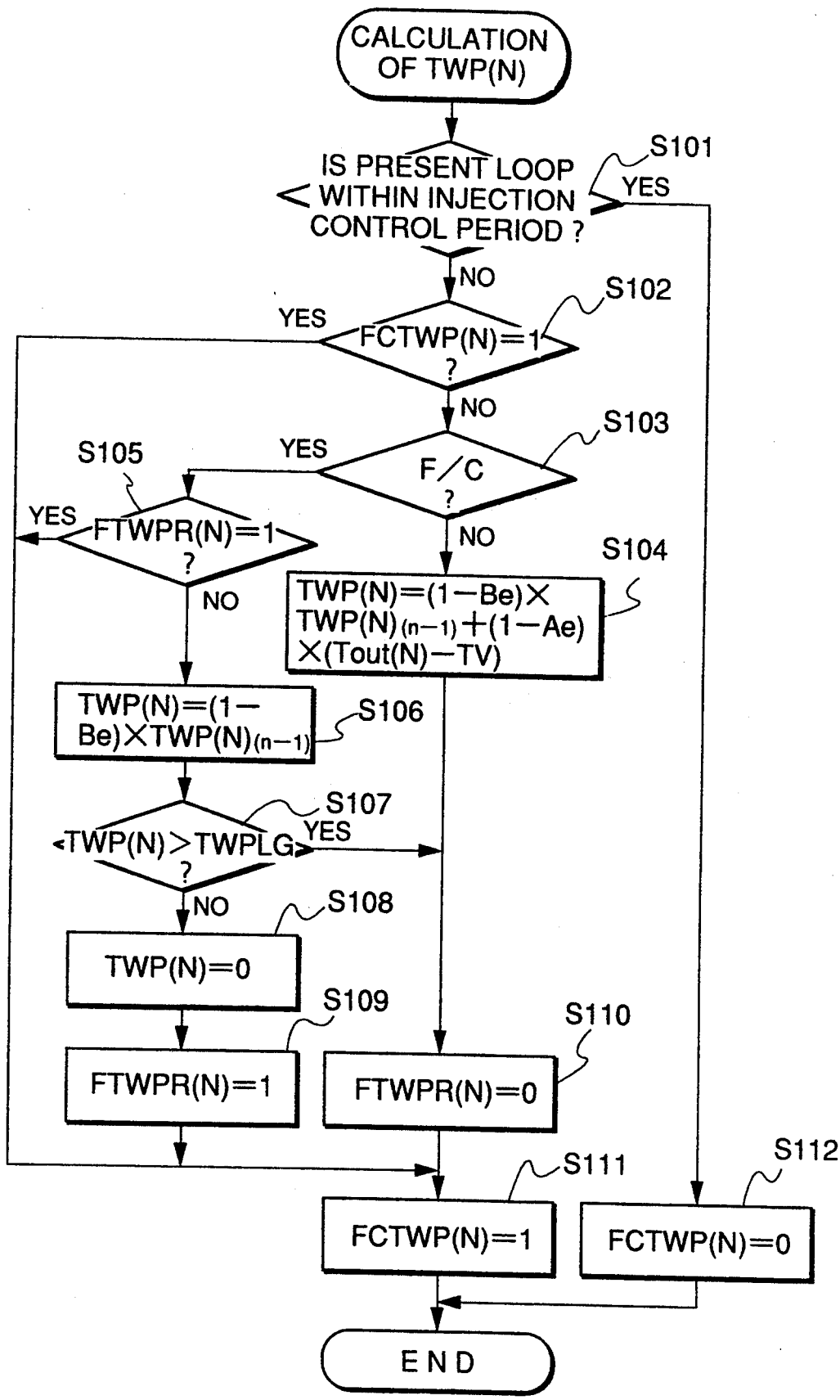
FIG. 4 is a flowchart of a program for calculating an amount of fuel adhering to the inner surface of the intake pipe (TWP(N))

At the following step S7, a fuel amount TNET to be supplied into the combustion chamber of a cylinder into which the fuel injection is to be made in the present loop, is calculated by the use of the following equation (4):

$$TNET = Tcyl(N) + Ttotal - Be \times TWP(N) \qquad (4)$$

where TWP(N) represents an intake pipe-adherent fuel amount (estimated value), which is calculated by a subroutine in FIG. 4. (Be×TWP(N)) corresponds to an amount of fuel, which is carried off fuel adhering to the inner surface of the intake pipe 2 into the combustion chamber. A fuel amount corresponding to the fuel amount carried off the intake pipe inner surface need not be injected, and therefore, is to be subtracted from the value Tcyl(N) in the equation (4).

At the next step S8, it is determined whether or not the value TNET calculated by the equation (4) is larger than a value of 0. If the answer is negative (NO), i.e., if TNET<0, the fuel injection amount Tout is set to 0 at a step S9, followed by terminating the program. If the answer to the question of the step S18 is affirmative (YES), i.e., TNET>0, the Tout value is calculated by the use of the following equation (5):

$$Tout = TNET(N)/Ae \times KLAF + TV \qquad (5)$$

where KLAF is the aforementioned air-fuel ratio correction coefficient calculated in response to the output from the LAF sensor 15. TV is an ineffective time correction term.

Thus, a fuel amount corresponding to (TNET(N)×KLAF+Be×TWP(N)) is supplied to the combustion chamber by opening the fuel injection valve 6 over the time period Tout calculated by the equation (5). A step S11 in FIG. 2 is executed following execution of a step S27 in FIG. 5, hereinafter referred to.

FIG. 4 shows a program for calculating the intake pipe-adherent fuel amount TWP(N), which is executed upon generation of each CRK signal pulse which is generated whenever the crankshaft rotates through a predetermined angle (e.g. 45 degrees).

At a step S101, it is determined whether or not the present loop of execution of this program falls within a time period after the start of the calculation of the fuel injection amount Tout and before the fuel injection is completed (hereinafter referred to as "the injection control period"). If the answer is affirmative (YES), a first flag FCTWP(N) is set to a value of "0" at a step 112, followed by terminating the program. If the answer to the question of the step 101 is negative (NO), i.e., if the present loop is not within the injection control period, it is determined at a step S102 whether or not the first flag FCTWP(N) is equal to 1. If the answer is affirmative (YES), that is, if FCTWP(N)="1", the program jumps to a step S111, whereas if the answer is negative (NO), i.e., if FCTWP(N)="0", it is determined at a step S103 whether or not the engine is under fuel cut (interruption of the fuel supply).

If the engine is not under fuel cut, the intake pipe-adherent fuel amount TWP(N) is calculated at a step S104 by the use of the following equation (6), then a second flag FTWPR(N) is set to a value of "0", and the first flag FCTWP(N) is set to a value of "1" at steps S110 and S111, followed by terminating the program:

$$TWP(N) = (1-Be) \times TWP(N) \\ (n-1) + (1-Ae) \times (Tout(N) - TV) \qquad (6)$$

where TWP(N) (n−1) represents a value of TWP(N) obtained on the last occasion, and Tout(N) an updated or new value of the fuel injection amount Tout which has been calculated by the program of FIG. 2. The first term on the right side corresponds to a fuel amount remaining on the inner surface of the intake pipe 2 without being carried into the combustion chamber in the present loop, out of the fuel previously adhering to the inner surface of the intake pipe 2, and the second term on the right side corresponds to a fuel amount newly adhering to the inner surface of the intake pipe 2 out of fuel newly injected in the present loop.

If the answer to the question of the step S103 is affirmative (YES), i.e., if the engine is under fuel cut, it is determined at a step S105 whether or not the second flag FTWPR(N) has been set to a value of "1". If the answer is affirmative (YES), i.e., if FTWPR(N)="1", the program jumps to the step S111. If the answer is negative (NO), i.e., if FTWPR(N)="0", the adherent fuel amount TWP(N) is calculated by the use of the following equation (7) at a step S106, and then the program proceeds to a step S107:

$$TWP(n) = (1-Be) \times TWP(N) (n-1) \qquad (7)$$

The equation (7) is identical with the equation (6), except that the second term on the right side is omitted. The reason for the omission is that there is no fuel newly adhering to the intake pipe inner surface, due to fuel cut.

At the step 107, it is determined whether or not the calculated TWP(N) value is larger than a very small predetermined value TWPLG. If the answer is affirmative (YES), i.e., if TWP(N)>TWPLG, the program proceeds to the next step S110. If the answer is negative (NO), i.e., if TWP(N)<TWPLG, the TWP(N) value is set to a value of "0" at a step S108, and then the second flag FTWPR(N) is set to a value of "1" at a step S109, followed by the program proceeding to the step S111.

Figure 5:
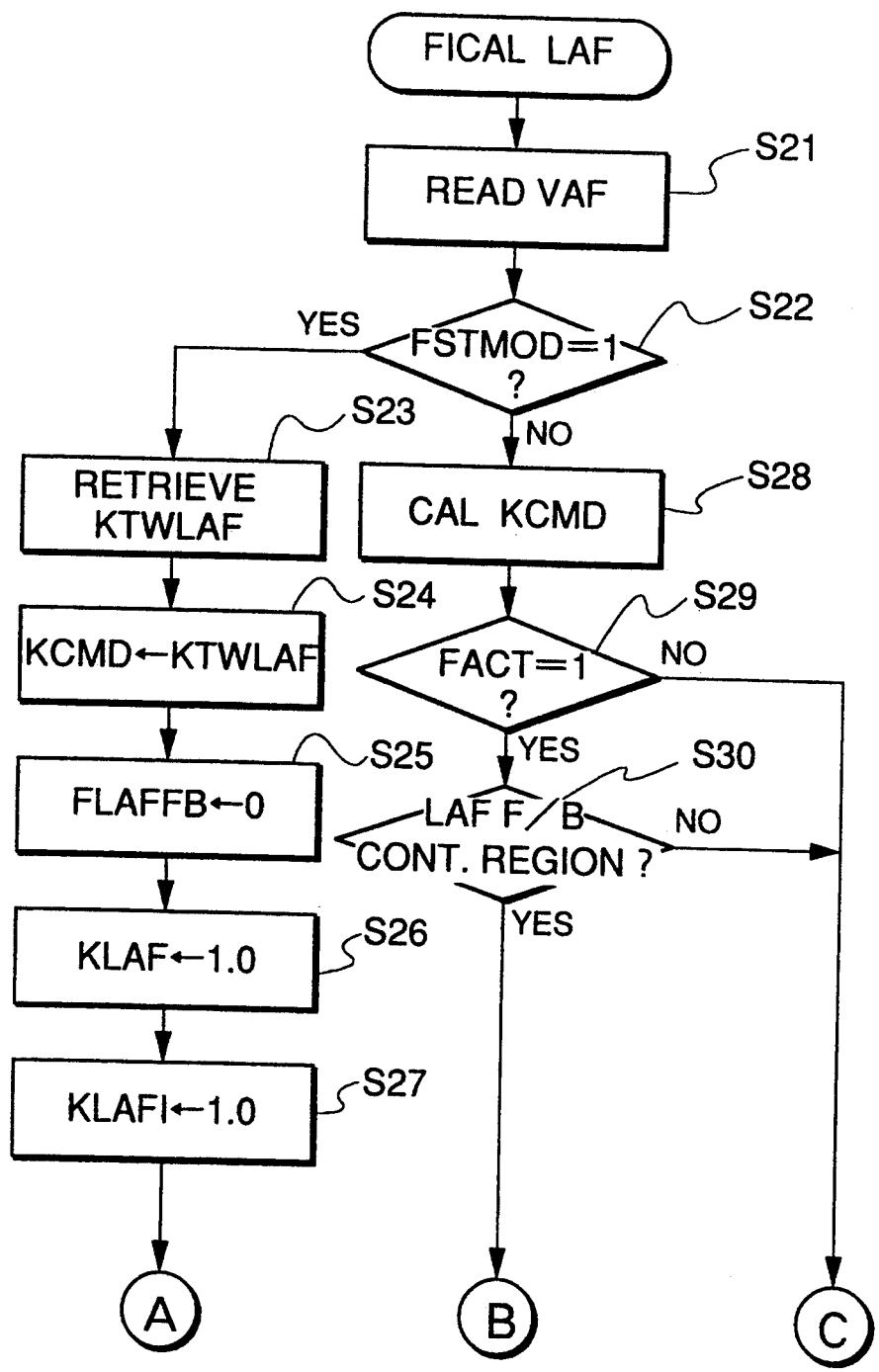
FIG. 5 is a flowchart of part of a subroutine for determining an air-fuel ratio control mode.
Figure 6:
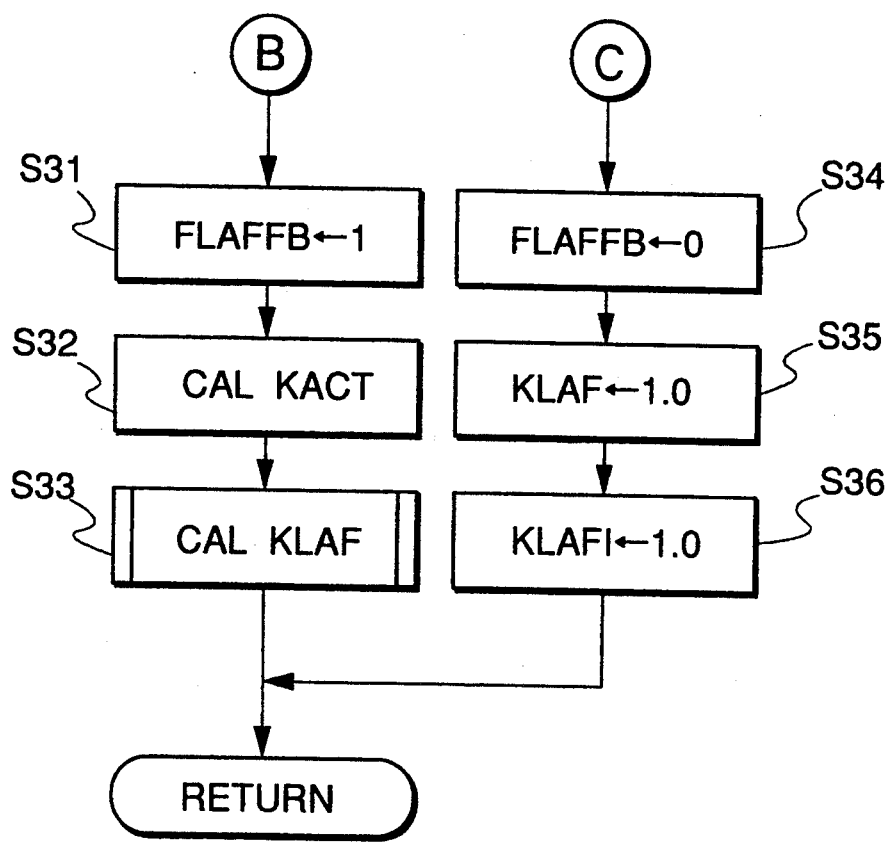
FIG. 6 is a flowchart of a continued part of the subroutine of FIG. 5.

FIGS. 5 and 6 show details of the air-fuel ratio control mode-determining subroutine (FICAL LAF) which is executed at the step S5 in FIG. 2. This program is executed upon generation of each CRK signal pulse which is generated whenever the crankshaft rotates through a predetermined angle (e.g. 45°) and in synchronism therewith.

First, at a step S21 in FIG. 5, an output voltage value VAF from the LAF sensor 15 is read in. Then, at a step S22 it is determined whether or not a flag FSTMOD is equal to "1", i.e. whether or not the engine is being started. If the answer is affirmative (YES), the program proceeds to a step S23 where a value of a desired air-fuel ratio coefficient KTWLAF to be applied at a low coolant temperature is retrieved from a map, in accordance with the engine coolant temperature TW. The coefficient KTWLAF is applied in order to set the air-fuel ratio to a rich value when the engine coolant temperature is low.

At the next step S24 a present value of the desired air-fuel ratio coefficient KCMD is set to the value of the desired air-fuel ratio coefficient KTWLAF obtained at the step S23. Since the engine is now being started, the air-fuel ratio feedback control should be inhibited, and therefore a flag FLAFFB is set to "0" at a step S25. Then, at a step S26 the value of the air-fuel ratio feedback correction coefficient KLAF is set to a value of 1.0. Similarly, at a step S27 an I-term (integral term) KLAFI of the correction coefficient KLAF is set to a value of 1.0. These values KLAF, KLAFI are stored to be used as initial values when the air-fuel ratio feedback control is started in a subsequent loop. Following the execution of the step S27, the program proceeds to the step S11 in FIG. 2.

If the answer to the question of the step S22 is negative (NO), i.e. if the engine is in a normal operating condition after completion of the starting operation, the program proceeds to a step S28 where the desired air-fuel ratio coefficient KCMD is calculated in accordance with operating conditions of the engine, by the use of the following equation (8):

$$KCMD = KTWLAF \times KBS \times KWOT \times XWOT \quad (8)$$

where KBS represents a correction coefficient for changing the air-fuel ratio in response to a gear position assumed by a transmission, not shown, of the engine, such as 5th speed position, 4th speed position, and 3rd speed position, KWOT a correction coefficient for enriching the air-fuel ratio at wide-open-throttle acceleration of the engine when the throttle valve is fully opened, and XWOT a correction coefficient for increasing the fuel amount so as to cool the engine when the engine coolant temperature is high.

Then, at a step S29 it is determined whether or not a flag FACT is equal to "1" to determine whether or not the LAF sensor 15 has been activated. If the answer is affirmative (YES), the program proceeds to a step S30 where it is determined whether or not the engine is operating in an air-fuel ratio feedback control region. More specifically, it is determined whether or not the engine is operating in a region other than a predetermined low temperature region, a predetermined high temperature region, a predetermined low speed region, a predetermined high speed region, an air-fuel ratio-leaning region, and a decelerating fuel cut region.

If the answer to the question of the step S30 is affirmative (YES), i.e. if the engine is operating in the air-fuel ratio feedback control region, the flag FLAFFB is set to "1" in order to carry out the air-fuel ratio feedback control at a step S31 in FIG. 6.

Then, at a step S32 an actual air-fuel ratio value KACT is calculated based upon the output voltage value VAF from the LAF sensor 15 read in at the step S21. In other words, an equivalence ratio $1\lambda$ ($\lambda$:excess air ratio) is calculated. Then, at a step S33 the feedback correction coefficient KLAF is calculated by a subroutine shown in FIGS. 7-9, followed by terminating the program.

On the other hand, if the answer to the step S29 or S30 is negative (NO), i.e. if the LAF sensor 15 is not activated or if the engine is not in the air-fuel ratio feedback control region, the program proceeds to a step S34 in FIG. 6 where the flag FLAFFB is set to "0" to inhibit the air-fuel ratio feedback control. Then, at steps S35 and S36 the feedback correction coefficient KLAF and the I-term KLAFI are both set to "1.0" for the same reason as mentioned with respect to the steps S26, S27, followed by terminating the program.

Figure 7:
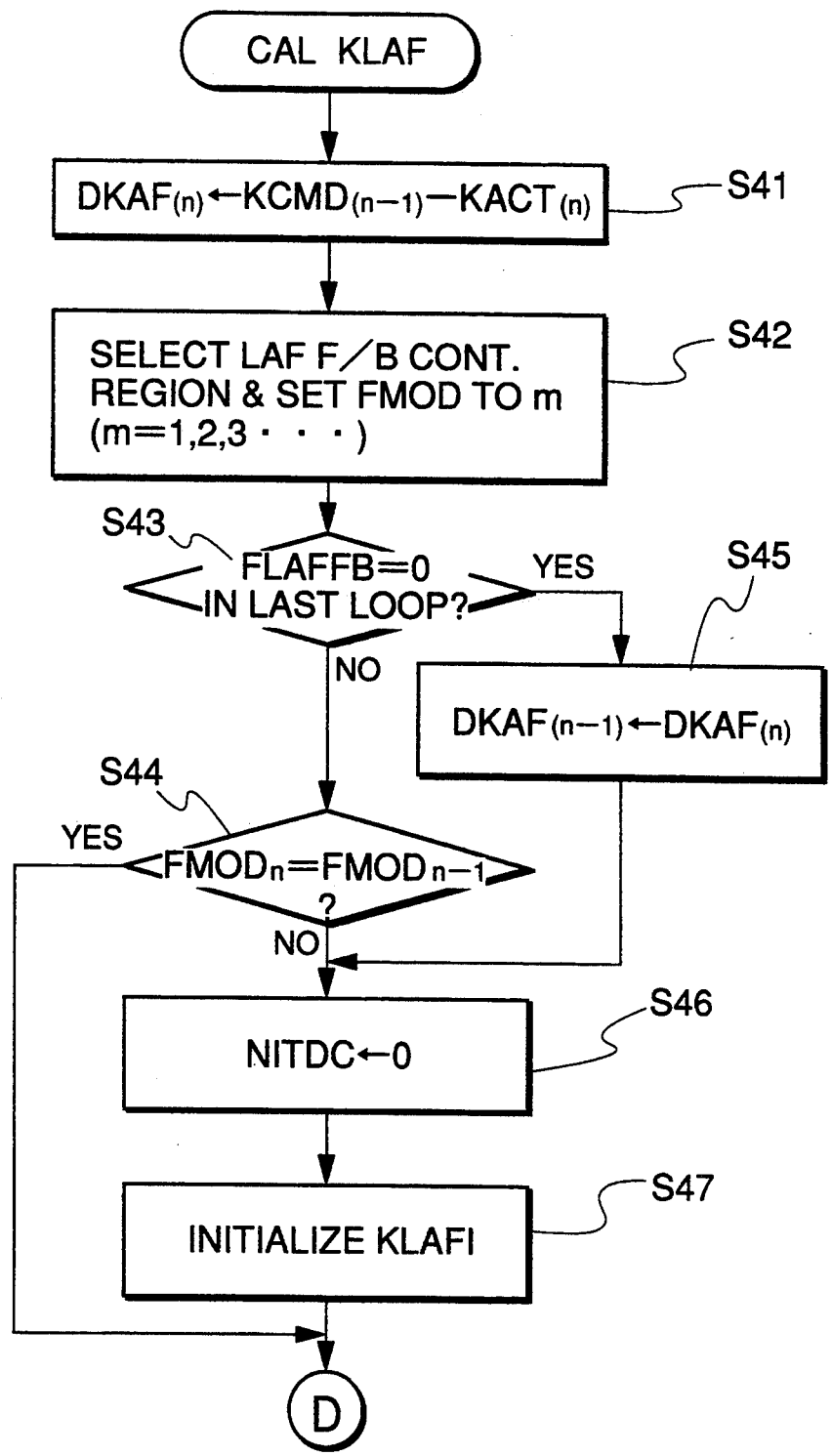
FIG. 7 is a flowchart of part of a subroutine for calculating a feedback control correction coefficient KLAF.
Figure 8:
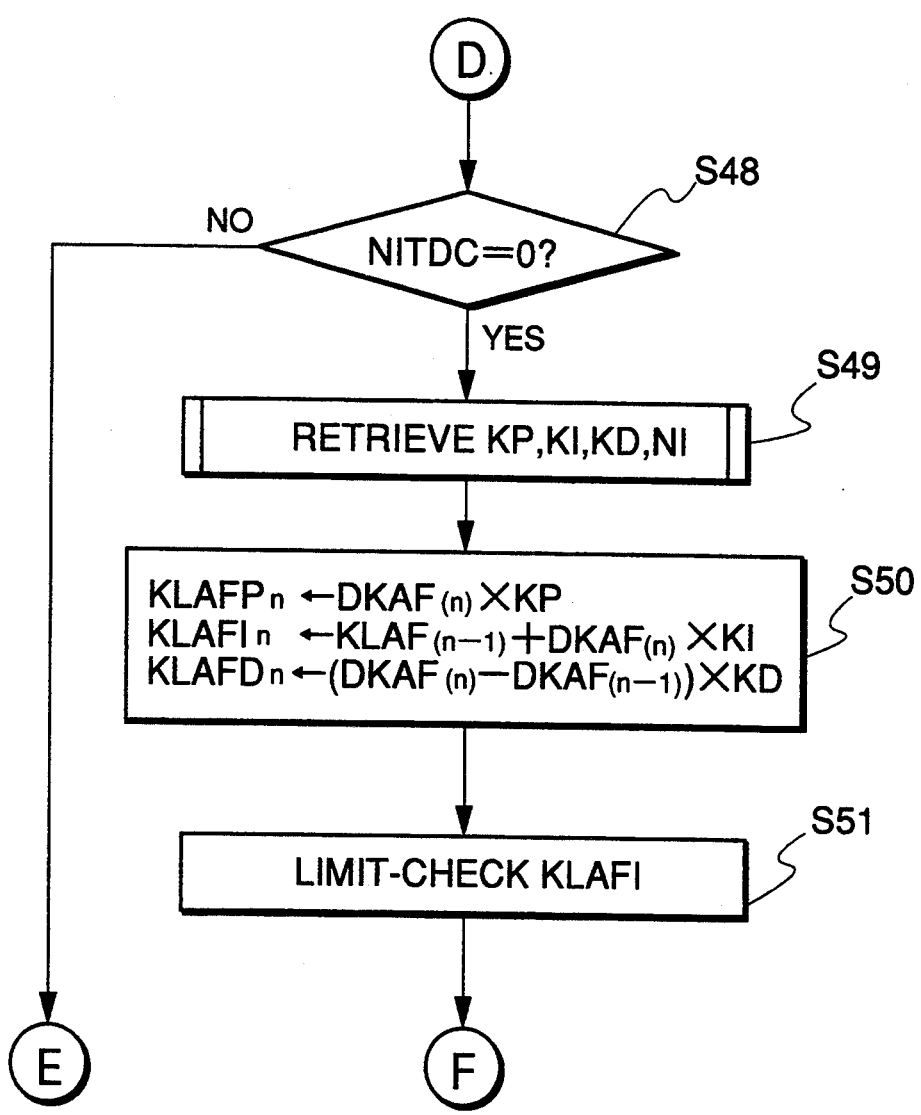
FIG. 8 is a flowchart of a continued part of the subroutine of FIG. 7.
Figure 9:
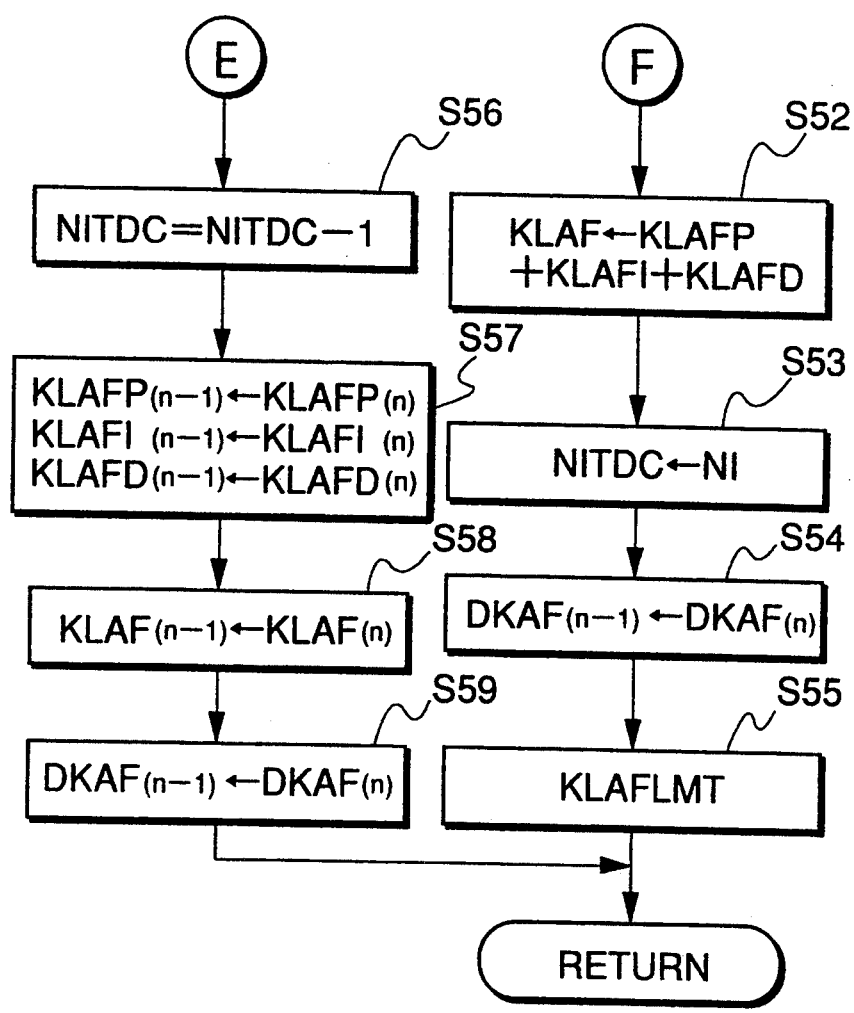
FIG. 9 is a flowchart of a further continued part of the subroutine of FIG. 7.

FIGS. 7-9 show details of the subroutine (CAL KLAF) for calculating the feedback correction coefficient KLAF, which is executed at the step S33 in FIG. 6. This program is executed upon generation of each CRK signal pulse generated whenever the crankshaft rotates through a predetermined angle (e.g. 45°) and in synchronism therewith.

First, at a step S41 in FIG. 7, a calculation is made of a present value DKAF (n) of a value DKAF which is a difference between an immediately preceding value KCMD(n−1) of the desired air-fuel ratio coefficient KCMD and a present value KACT(n) of the actual air-fuel ratio KACT. At the next step S42, a feedback control mode appropriate to an operating condition in which the engine is operating is selected, and a mode flag FMOD is set to a value m (m=1, 2, 3, . . .) corresponding to the selected mode. The mode flag FMOD is set to "1" when the engine is operating in an idling region within the air-fuel ratio feedback control region, and to "2" when the engine is in an ordinary or "off-idle" region within the air-fuel ratio feedback control region other than the idling region. Depending upon the thus set value of the mode flag FMOD, the I-term KLAFI of the feedback correction coefficient KLAF is set to an initial value KREFi (i=1, 2, 3, . . . m) which is an average value of the KLAFI value and corresponds to the set value of the flag FMOD, as hereinafter described.

At the next step S43 it is determined whether or not the flag FLAFFB is equal to "0", i.e. whether or not the air-fuel ratio feedback control was executed in the last loop, in other words, whether or not in the present loop the air-fuel ratio feedback control is started. If the answer is negative (NO), i.e. if the flag FLAFFB is not equal to "0" indicating that the feedback control was executed also in the last loop, the program proceeds to a step S44, whereas if the answer is affirmative (YES), i.e. if the feedback control was not executed in the last loop, the program proceeds to a step S45.

At the step S44, it is determined whether or not there has been a change in the mode flag FMOD set at the step S42, i.e. a change in the feedback control mode. For example, if in the present loop the mode flag FMOD is equal to "2" though it was set to "1" in the last loop, it is determined that there has been a change in the feedback control mode. If the answer to the question of the step S44 is negative (NO), the program proceeds to a step S46.

On the other hand, if the answer to the question of the step S43 is affirmative (YES), i.e. if the air-fuel ratio feedback control has been started first in the present loop, the program proceeds to the step S45, where the present value DKAF(n) is set to the immediately preceding value DKAF (n−1) of the DKAF value. Namely, since the feedback control was not executed in the last loop so that no value of DKAF(n−1) exists, the present value DKAF(n) is set to the immediately preceding value DKAF(n−1) at the step S45 in order to apply the DKAF value in processing of steps S50, S54 and S59, hereinafter referred to. The execution of the step S45 is followed by execution of a step S46.

At the step S46, a count value NITDC of a counter for counting a "thinning-out" number NI is set to 0. The count value NITDC is a variable for updating the air-fuel ratio correction coefficient KLAF whenever TDC signal pulses are generated in a number corresponding to the "thinning-out" number NI which is set in dependence on operating conditions of the engine.

Then, at a step S47, the I-term KLAFI is set to an initial value KREFi depending upon the mode flag FMOD set at the step S42. The initialization of KLAFI is made by retrieving a FMOD-KREFi table, not shown, in such a manner that when FMOD="1", KLAFI is set to KREF1, and when FMOD="2", KLAFI is set to KREF2.

At the next step S48, it is determined whether or not the "thinning-out" number NITDC is equal to 0. If the answer is affirmative (YES), the program proceeds to a step S49. In this connection, in the first loop where the air-fuel ratio feedback control is started, the number NITDC is set to "0" at the step S46.

Then, at a step S49, respective coefficients KP, KI, and KD of the P-term, I-term, and D-term and the "thinning-out" number NI, which are used in executing the air-fuel ratio feedback control, are determined by retrieving tables, by a subroutine, hereinafter described, followed by the program proceeding to a step S50.

At the following step S50, present values of the P-term KLAFP, I-term KLAFI, and D-term KLAFD of the correction coefficient KLAF are calculated by the use of the coefficients KP, KI, and KD obtained at the step S49 according to the following equation (9):

$$KLAFP(n) = DKAF(n) \times KP$$

$$KLAFI(n) = KLAFI(n-1) + DKAF(n) \times KI$$

$$KLAFD(n) = DKAF(n) - DKAF(n-1) \times KD \quad (9)$$

where KLAFI(n−1) is an immediately preceding value of the I-term of the coefficient KLAF, which is set to 1.0 when the present loop is the first loop in which the air-fuel ratio feedback control is started, DKAF(n) a present value of the DKAF value which is calculated at the step S41, and DKAF(n−1) an immediately preceding value of the DKAF value.

Following the calculation of the values KLAFP, KLAFI and KLAFD, the program proceeds to a step S51, where the calculated KLAFI value is subjected to limit checking by comparison with predetermined upper and lower values to avoid a degradation in the feedback controllability. Then, at a step S52 in FIG. 9 a value of the correction coefficient KLAF is calculated by summing up the values KLAFP, KLAFI and KLAFD obtained as above, and at a step S53 the count value NITDC is set to the "thinning-out" number NI obtained at the step S49.

At the following step S54, the value DKAF(n) is set as an immediately preceding value DKAF(n−1). Then, at a step S55 the calculated KLAF value is subjected to limit checking in a similar manner to the limit checking of the KLAFI value at the step S51, followed by terminating the program.

On the other hand, if the answer to the question of the step S48 is negative (NO), i.e. if the "thinning-out" number NITDC is not equal to 0, the number NITDC is decreased by a decrement of 1 at a step S56, and present values of KLAFP, KLAFI, and KLAFD are set as immediately preceding values thereof. Then, at a step S59 a present value of DKLAF is set as an immediately preceding value thereof.

In the present embodiment, the values of coefficients KP, KI, and KD which determine the feedback gain applied in executing the air-fuel ratio feedback control are determined in dependence on the direct supply ratio Ae and the carry-off ratio Be, referred to hereinbefore. This is because the feedback gain can be set to values more appropriate to operating conditions of the engine by using the direct-supply ratio Ae and the carry-off ratio Be which directly reflect the amount of fuel actually drawn into the combustion chamber, as compared with indirect parameters such as the engine rotational speed and the engine coolant temperature as employed in the prior art.

More specifically, according to the present invention, the feedback gain is determined by the amount of fuel per se actually drawn into the cylinders, irrespective of other factors such as the engine coolant temperature. That is, since the air-fuel ratio of the mixture supplied into a cylinder is determined by the amount of fuel actually supplied into the cylinder, the feedback gain can be set to an optimal value appropriate to an operating condition in which the engine is operating, by determining it based upon the Ae and Be values directly representing the behavior of fuel injected into the intake pipe, irrespective of other factors such as the engine coolant temperature. In the present embodiment, the value ranges of the direct supply ratio Ae and the carry-off ratio Be are delimited in a manner described below by the use of an equation (10) given below, to thereby determine the feedback gain.

Figure 11:
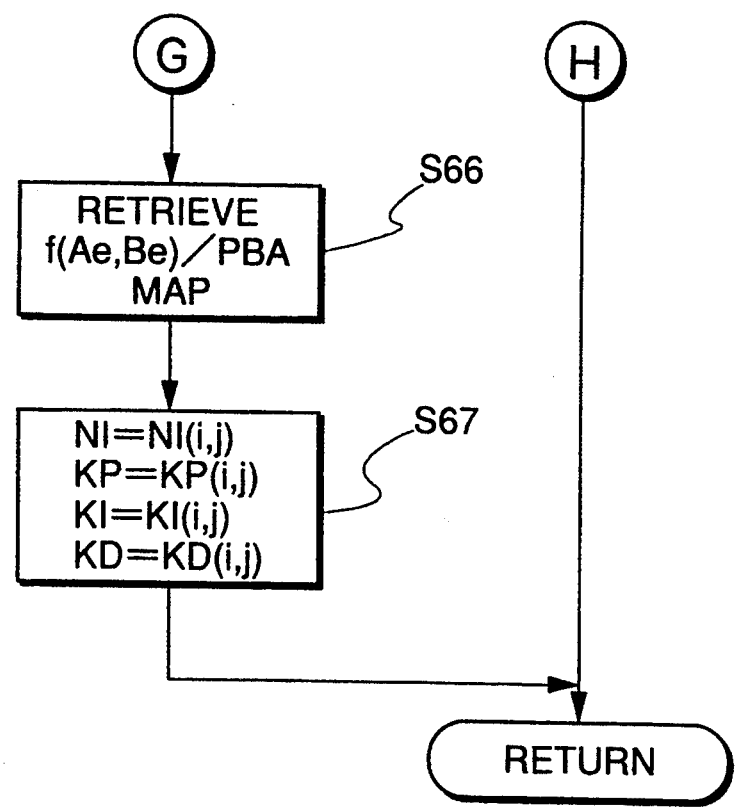
FIG. 11 is a flowchart of a continued part of the subroutine of FIG. 10.
Figure 10:
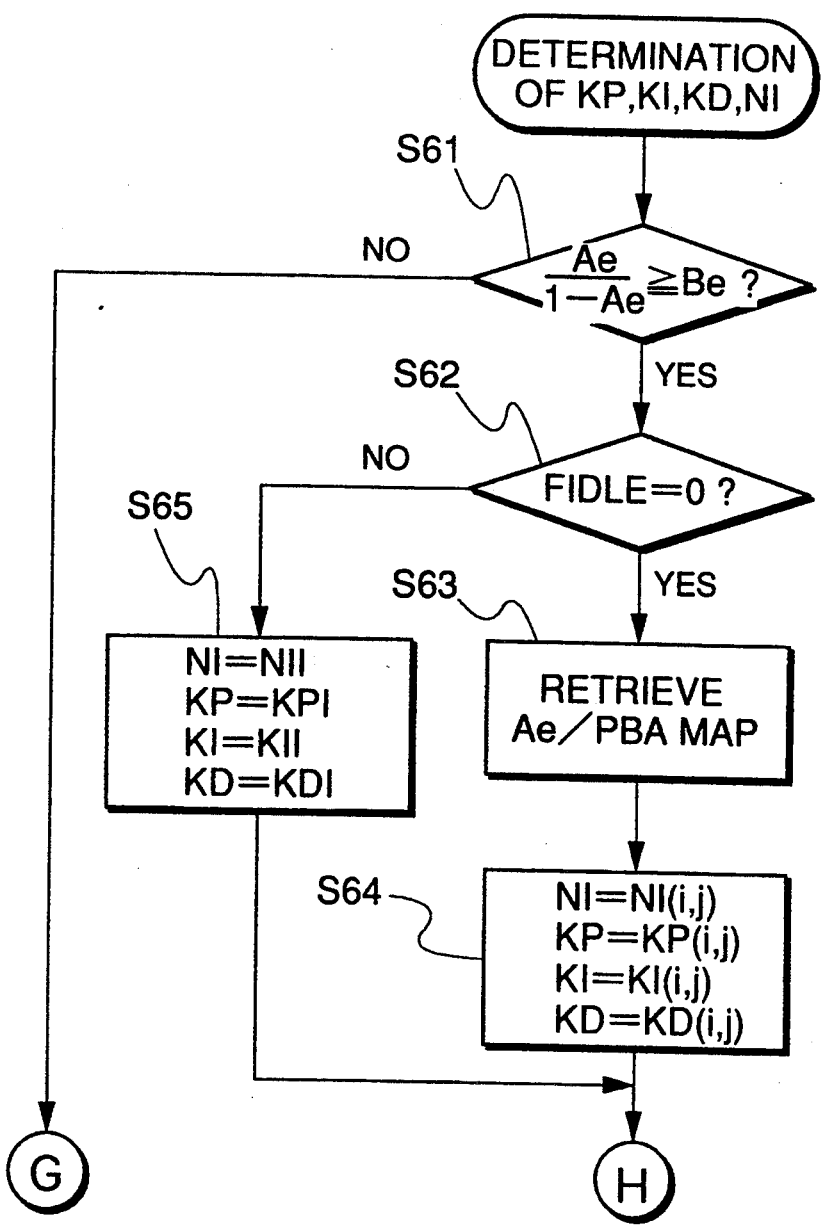
FIG. 10 is a flowchart of a subroutine for determining coefficients KP, KI, KD, and a "thinning-out" number NI used in the calculation of the feedback control correction coefficient KLAF.

FIGS. 10 and 11 show details of the subroutine for determining values of the coefficients KP, KI, KD and the "thinning-out" number NI, which is executed at the step S49 in FIG. 8.

First, at a step S61, it is determined whether or not the following equation (10) is satisfied:

$$Ae/(1-Ae) \geq Be \quad (10)$$

The reason for delimiting the value ranges of Ae and Be as above will be described later. If the answer to the question of the step S61 is affirmative (YES), i.e. if the above equation (10) is satisfied, the program proceeds to a step S62 where it is determined whether or not a flag FIDLE is equal to "0" to determine whether or not the engine is idling. If the engine is not idling, the program proceeds to a step S63 where values of the coefficients KP, KI, and KD and the "thinning-out" number NI are retrieved from maps shown in FIG. 12 in accordance with the direct supply ratio Ae and the intake pipe absolute pressure PBA.

As shown in FIG. 12, the above maps are provided with predetermined map values KP (i, j), KI (i, j), KD (i, j), and NI(i, j) (i=0~3, j=0~2) corresponding, respectively, to predetermined map values PBA0-PBA3 and Ae0-Ae4 of PBA and Ae so that a value of each of the above coefficients and the "thinning-out" number is read from a respective map, which corresponds to map values of PBA and Ae.

At the next step S64, the values of the coefficients KP, KI, and KD, and the "thinning-out" number NI are set to the values read at the step S63, followed by terminating the program.

If the answer to the question of the step S62 is negative (NO), i.e. if the flag FIDLE is equal to "1" indicating that the engine is idling, the program proceeds to a step S65 where values of KP, KI, KD, and NI for use during idling of the engine are read from a memory location in the memory means 5c of the ECU 5 in which values of KP, KI, KD and NI appropriate to the idling condition of the engine are previously stored, and the values of KP, KI, KD, and NI are set to the read values, followed by terminating the program.

If the answer to the question of the step S61 is negative (NO), i.e. if the aforementioned equation (10) is not satisfied, the program proceeds to a step S66 in FIG. 11 where values of the coefficients KP, KI, and KD and the "thinning-out" number NI are retrieved from maps shown in FIG. 13 in accordance with the direct supply ratio Ae, the carry-off ratio Be and the intake pipe absolute pressure PBA. Thus, while at the step S63 the values of KP, KI, KD, and NI are determined based upon the direct supply ratio Ae and the intake pipe absolute pressure PBA alone, at the step S66 they are determined based upon not only the direct supply ratio Ae and the intake pipe absolute pressure PBA but also the carry-off ratio Be.

The maps of FIG. 13 are provided with predetermined map values KP(i, j), KI(i, j), KD(i, j), and NI(i, j) (i=0~3, j=0~2) corresponding, respectively, to predetermined map values PBA0–PBA3 of PBA and functions of Ae and Be so that a value of each of the above coefficients and the "thinning-out" number is read from a respective map, which corresponds to a map value of PBA and a function of Ae and Be.

At the following step S67, the values of the coefficients KP, KI, and KD, and the "thinning-out" number NI are set to the values read at the step S66, followed by terminating the program.

The reason why the value ranges of Ae and Be are delimited as in the equation (10) in determining the values of the coefficients KP, KI, and KD in the subroutine of FIG. 10 will now be explained.

Figure 14:
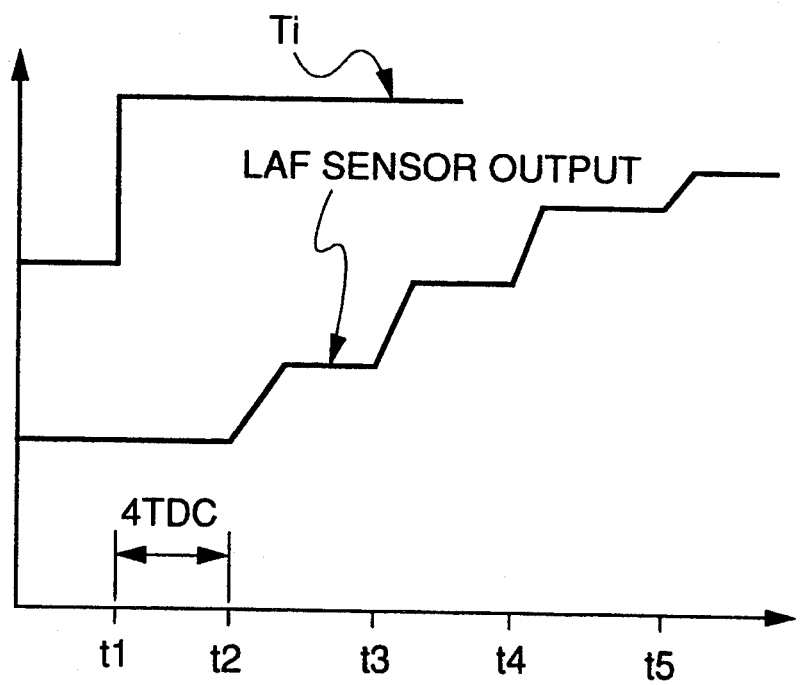
FIG. 14 is a timing chart showing a change in an output from a LAF sensor.

FIG. 14 shows a change in the output from the LAF sensor 15 assumed when the basic fuel amount Ti is stepwise changed as shown in the figure. In the figure, t1, t2, . . . show time points indicative of time elapsed whenever four TDC signal pulses are generated.

As shown in FIG. 14, when the basic fuel amount Ti is stepwise changed at a time point t1, which causes a change in the air-fuel ratio of a mixture supplied to the engine from a lean side to a rich side, it is seen that the output from the LAF sensor 15 does not immediately change upon the stepwise change in the basic fuel amount Ti, more specifically, it starts to stepwise change from the next time point t2 and thereafter stepwise changes at each of time points t3, t4, . . . . This is due to a fuel transport lag, etc. The change in the output from the LAF sensor 15 illustrated in the figure is based upon the assumption that there is no difference in the values of Ae and Be between the cylinders so that the output from the LAF sensor 15 shows the same change over a time period corresponding to generation of every four TDC signal pulses between the cylinders. The values of Ae and Be are already known because they have been calculated at the step S3 in FIG. 2.

Figure 15:
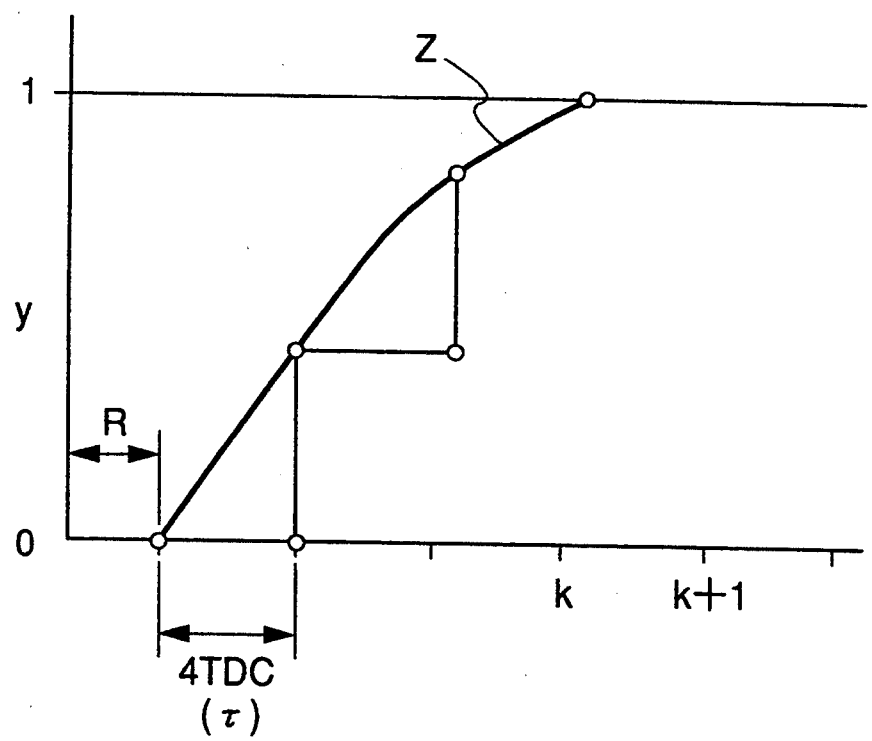
FIG. 15 is a diagram showing Ziegler Nicholas' Method.

The values of the coefficients KP, KI, and KD can be determined by the use of Ziegler Nicholas' Method as shown in FIG. 15. In the figure, $\tau$ represents a digitizing time (In the present embodiment, it is a time period corresponding to generation of four TDC signal pulses), R an ineffective time which is a time lag from the time the Ti value is stepwise changed to the time the resulting change in the air-fuel ratio is transmitted to the LAF sensor and which assumes an inherent value determined by the engine, and L the maximum slope of the curve Z in the figure.

According to Ziegler Nicholas' Method, when the digitizing time $\tau$, the ineffective time R and the maximum slope L have been determined, a value of the fuel amount required for obtaining the desired air-fuel ratio and the fuel supply timing can be determined, thereby enabling to determine the values of the coefficients KP, KI, and KD. The values of the digitizing time $\tau$ and the ineffective time R are known as mentioned before, but the maximum slope L is not known as yet. The maximum slope L can be determined as follows:

In a digital processing system, generally the maximum slope L can be expressed by the following equation (11):

$$L = |y(k+1) - y(k)|_{max.} \qquad (11)$$

where y represents a function of the air-fuel ratio in the exhaust gases, and k an optional cylinder.

Figure 16:
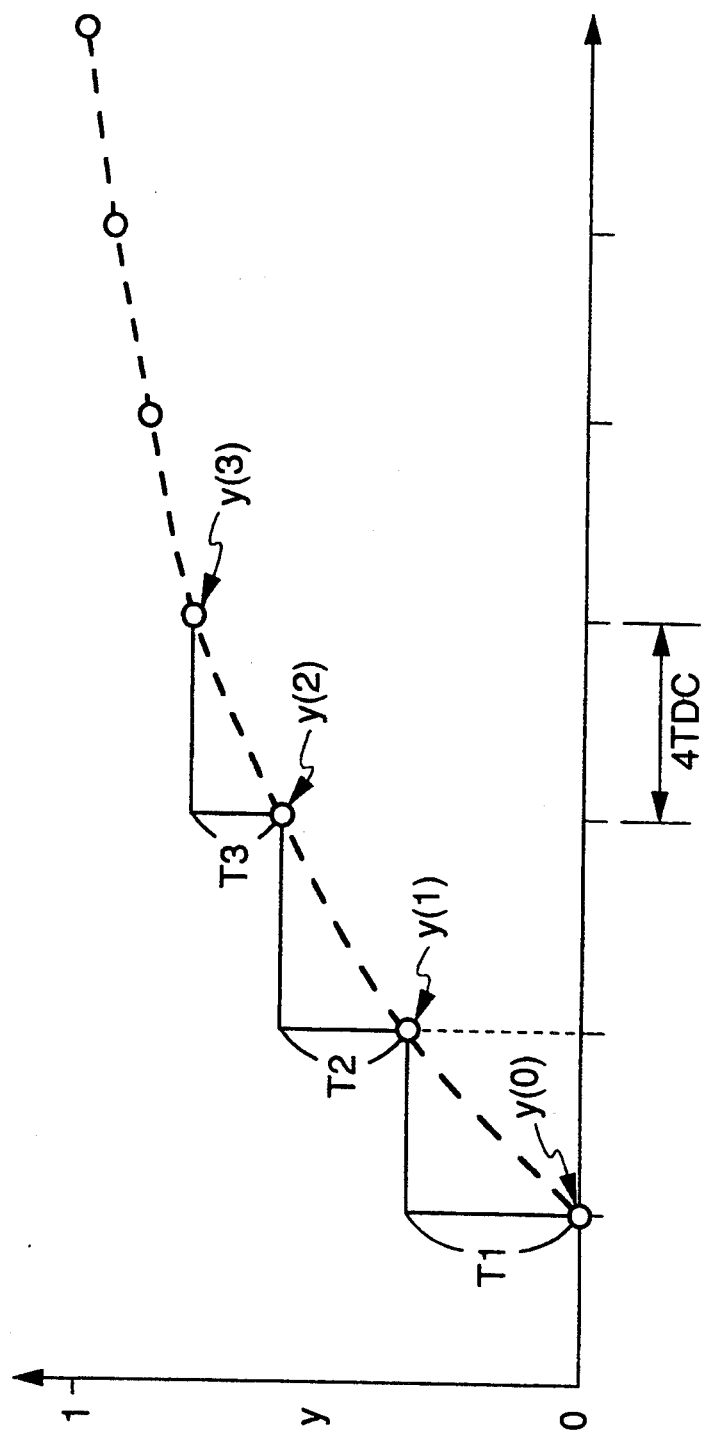
FIG. 16 is a diagram showing a manner of calculating the maximum slope L.

FIG. 16 shows a method of calculating the maximum slope L. In the figure, y(0), y(1), y(2), y(3), . . . are expressed as follows:

$$y(0) = (0);$$

$$Y(1) = Ae;$$

$$y(2) = Ae + (1 - Ae) \times Be;$$

$$y(3) = Ae + (1 - Ae) \times Be + (1 - Be)(1 - Ae) \times Be$$

T1, T2, T3, . . . represent values of y corresponding to respective stepped portions of the curve Z, i.e. they are expressed as follows:

$$T1 = Ae;$$

$$T2 = (1 - Ae) \times Be;$$

$$T3 = (1 - Ae)(1 - Be) \times Be$$

Therefore, the following equations (12)–(14) are established $$Y(1) - Y(0) = Ae \qquad (12)$$

$$y(2) - Y(1) = (1 - Ae) \times Be \qquad (13)$$

$$Y(3) - y(2) = (1 - Ae)(1 - Be) \times Be \qquad (14)$$

Since Ae and Be represent rations, $0 \leq Ae \leq 1, 0 \leq Be \leq 1$. Therefore, the maximum slope L can be expressed by the above equation (12) or (13). Since the equations (12) and (13) are recurrence formulas, if T2 and T3 are compared with each other, $T2 \geq T3$. Therefore, the following equation (15) holds:

$$1 \geq (1 - Be) \qquad (15)$$

Since $0 \leq Be \leq 1$, the above equation (15) is always satisfied. Therefore, the maximum slope L becomes equal to T1 or T2, i.e. Ae or $(1 - Ae) \times Be$.

Here, assuming that the maximum slope L is equal to T1 (=Ae) corresponding to a portion of the curve z from Y(0) to y(1), $T1 \geq T2$. Therefore, the following equation (16) holds:

$$Ae \geq (1 - Ae) \times Be \qquad (16)$$

The equation (16) can be transformed as follows:

$$Ae/(1 - Ae) \geq Be$$

If this relationship is satisfied, the maximum slope L is equal to Ae. Thus, the maximum slope L is determined by the value of Ae. This is why the table using the direct supply ration Ae and the intake pipe absolute pressure PBA along is applied to determine the values of the coefficients KP, KI, and KD when the answer to the question of the step S61 is affirmative (YES).

When the relationship of $Ae/(1 - Ae) \geq Be$ is not satisfied, it means that the maximum slope L is equal to T2, that is, $L = (1 - Ae) \times Be$. This is why the table using not only the direct supply ration Ae and the intake pipe absolute pressure PBA but also the carry-off ratio Be is applied to determine the values of the coefficients KP, KI, and KD when the answer to the question of the step S61 is negative (NO) (see the step S66).

As described above, according to the present invention, the feedback correction value is set based upon at least on of the direct supply ratio and the carry-off ration. As a result, the feedback gain can be set to a value appropriate to an amount of fuel actually supplied into the cylinder, based upon the direct supply ratio and/or the carry-off ratio, thereby enabling to control a control speed in the air-fuel ratio feedback control, to values optimal to operating conditions of the engine, resulting in improved exhaust emission characteristics.

What is claimed is:

1. In an air-fuel ratio control system for an internal combustion engine having at least one combustion chamber, an intake passage having an inner surface, fuel injection means arranged in said intake passage, and an exhaust passage, the air-fuel ratio control system including fuel supply amount-calculating means for calculating an amount of fuel to be supplied to said engine in response to the rotational speed of said engine and a parameter indicative of load on said engine, direct supply ratio-calculating means for calculating a direct supply ratio defined as a ratio of a fuel amount directly drawn into said combustion chamber during intake stroke in a present cycle of said engine to the whole fuel amount injected in the same cycle, carry-off ratio-calculating means for calculating a carry-off ratio defined as a ratio of a fuel amount carried off said inner surface of said intake passage and drawn into said combustion chamber during intake passage in the present cycle to the whole fuel amount which adhered to said inner surface of said intake passage in an immediately preceding cycle, air-fuel ratio-detecting means arranged in said exhaust passage for detecting an air-fuel ratio in exhaust gases from said engine, feedback correction value-setting means for setting a feedback correction value to a value such that the air-fuel ratio detected by said air-fuel ratio-detecting means becomes equal to a desired value, and fuel supply amount-correcting means for correcting said amount of fuel calculated by said fuel supply amount-calculating means by said direct supply ratio, said carry-off ratio, and said feedback correction value, wherein an amount of fuel corrected by said fuel supply amount-correcting means is injected by said fuel injection means into said intake passage, the improvement wherein said feedback correction value-setting means includes control speed-setting means for setting a control speed at which said feedback correction value is corrected, based upon at least one of said direct supply ratio and said carry-off ratio.

2. An air-fuel ratio control system as claimed in claim 1, wherein said feedback correction value is a feedback correction coefficient which is determined in response to the air-fuel ratio detected by said air-fuel ratio-detecting means and by which said amount of fuel calculated by said fuel supply amount-calculating means is multiplied.

3. An air-fuel ratio control system as claimed in claim 1, wherein said control speed-setting means sets said control speed based upon said direct supply ratio and pressure within said intake passage, when the following equation is satisfied:

$$Ae/(1-Ae) \geq Be$$

where Ae represents said direct supply ratio, and Be said carry-off ratio.

4. An air-fuel ratio control system as claimed in claim 3, wherein said control speed-setting means sets said control speed based upon said direct supply ratio, said carry-off ratio, and said pressure within said intake passage, when said equation is not satisfied.

5. An air-fuel ratio control system as claimed in any of the preceding claims, wherein said control speed is a feedback gain which is determined by at least one of a proportional term, an integral term, a differential term, said proportion term, said integral term, said differential term determining said feedback correction value, and frequency at which said feedback correction value is updated.

* * * * *